(12) United States Patent
Sommer

(10) Patent No.: US 8,348,035 B2
(45) Date of Patent: Jan. 8, 2013

(54) PRESSING-ON DEVICE FOR A CURRENT COLLECTOR AND METHOD FOR ENERGY TRANSMISSION

(75) Inventor: Martin Sommer, Weimar (DE)

(73) Assignee: Schunk Bahn- und Industrietechnik GmbH, Wettenberg (DE)

(*) Notice: Subject to any disclaimer, the term of this patent is extended or adjusted under 35 U.S.C. 154(b) by 366 days.

(21) Appl. No.: 12/634,885

(22) Filed: Dec. 10, 2009

(65) Prior Publication Data

US 2011/0139561 A1    Jun. 16, 2011

(30) Foreign Application Priority Data

Dec. 10, 2009   (DE) .......................... 10 2009 054 484

(51) Int. Cl.
*B60L 5/38* (2006.01)
(52) U.S. Cl. ............................. 191/49; 191/69
(58) Field of Classification Search ................ 191/45 R, 191/46, 47, 48, 49; 104/202–209, 279
See application file for complete search history.

(56) References Cited

U.S. PATENT DOCUMENTS

| | | | | |
|---|---|---|---|---|
| 1,754,016 A * | 4/1930 | Hershberger | ..................... | 191/49 |
| 1,872,351 A * | 8/1932 | Schaake et al. | ................. | 191/49 |
| 2,161,100 A * | 6/1939 | Sierk | .............................. | 191/49 |
| 2,892,904 A * | 6/1959 | Sierk | .............................. | 191/49 |
| 2,967,915 A * | 1/1961 | Dean | ............................... | 191/49 |
| 3,114,441 A * | 12/1963 | Sprigings | ........................ | 191/69 |
| 3,123,191 A * | 3/1964 | Sprigings | ........................ | 191/58 |
| 3,509,292 A * | 4/1970 | Dehn | .............................. | 191/49 |
| 3,672,308 A * | 6/1972 | Segar | ............................ | 104/246 |
| 3,740,498 A * | 6/1973 | Herbert | ........................... | 191/49 |
| 3,752,274 A * | 8/1973 | Falkiner-Nuttall | ............. | 191/49 |
| 3,767,868 A * | 10/1973 | Storrer | ........................... | 191/49 |
| 3,786,204 A * | 1/1974 | Laurent | ........................... | 191/48 |
| 3,804,996 A * | 4/1974 | Monteith | ..................... | 191/1 R |
| 3,821,497 A * | 6/1974 | Laurent | ............................ | 91/57 |
| 4,023,658 A * | 5/1977 | Sierk | .............................. | 191/49 |
| 4,042,081 A * | 8/1977 | Pier | ................................ | 191/8 |
| 4,155,434 A * | 5/1979 | Howell, Jr. | ................. | 191/22 R |
| 4,168,770 A * | 9/1979 | Segar et al. | ..................... | 191/57 |
| 4,464,546 A * | 8/1984 | Culver | ............................ | 191/49 |
| 4,572,929 A * | 2/1986 | Nitschke et al. | ............. | 191/29 R |
| 5,673,774 A * | 10/1997 | Trapp et al. | ..................... | 191/49 |
| 6,152,273 A * | 11/2000 | Kilkenny | ......................... | 191/58 |
| 7,188,716 B2 * | 3/2007 | Lamschick | ..................... | 191/49 |
| 2011/0139561 A1 * | 6/2011 | Sommer | ......................... | 191/49 |

FOREIGN PATENT DOCUMENTS

| | | |
|---|---|---|
| DE | 399826 C | 1/1924 |
| DE | 4438720 A1 | 8/2010 |

* cited by examiner

*Primary Examiner* — Jason C Smith
(74) *Attorney, Agent, or Firm* — Fredrikson & Byron, P.A.

(57) ABSTRACT

A current collector for a rail vehicle and a method for transmitting energy from power rails to the vehicle employ a contact shoe that includes an upper sliding contact surface and a lower sliding contact surface. A first pressing-on force forms a sliding contact between the upper sliding contact surface and an upper contact surface of a first power rail, when the contact shoe is in an upper sliding contact position. A second pressing-on force forms a sliding contact between the lower sliding contact surface and a lower contact surface of a second power rail, when the contact shoe is in a lower sliding contact position. The pressing-on forces may be applied by a pressing-on device attached to the contact shoe. The contact shoe may be moved into the upper sliding contact position by the first power rail, and into the lower sliding contact position by the second power rail.

16 Claims, 6 Drawing Sheets

PRESSING-ON DEVICE FOR A CURRENT COLLECTOR AND METHOD FOR ENERGY TRANSMISSION

RELATED APPLICATIONS

This application claims priority to German Patent Application No. 10 2009 054 484.4 filed Dec. 10, 2009, the teachings of which are incorporated herein by reference.

TECHNICAL FIELD

The invention relates to a pressing-on device for a current collector, a current collector and a method for energy transmission from a current, or power rail to a rail vehicle that is adapted to travel along power rails.

BACKGROUND

Current collectors are adequately known from the prior art and are regularly used on rail vehicles for transmitting electric energy from a power rail to the vehicle. Usually the power rail is arranged in the region of the traveling rails and is also designated as so called third rail. With the known current collectors a contact shoe is fastened to an arm, wherein the lever presses the contact shoe against a wiper contact surface of the power rail with a defined pressing-on force. The pressing-on force is generated by a pneumatic cylinder which is connected to the arm which it operates in the manner of a lever. Starting out from an unloaded end position of the arm the contact shoe is moved as far as to a stop or to a maximum wiper contact position upon actuation by the pneumatic cylinder subject to the generation of the pressing-on force. Without contact to a power rail the contact shoe is then located above a working position or a sliding contact position, which in the case of contacting of a power rail is formed. Because of this, possible horizontal spacing fluctuations of the power rail relative to the current collector or rail vehicle can be offset. Starting out from the end position, the arm is pushed back via the contact shoe through the moving of the contact shoe on to the power rail via a leading ramp, wherein the required pressing-on force is generated by the pneumatic piston and/or additional springs.

Contacting of a power rail described above can be effected with a contact shoe located under the power rail or a contact surface of the power rail on the one hand and with a contact shoe located above a power rail or a lower contact surface of the power rail on the other hand. Each of these cases is dependent on which power rail system is used in the respective rail section or rail network. If a rail vehicle is to change from a power rail system to another one it is necessary to convert the current collector. For example the sliding contact with its sliding contact surface for example has to be turned by 180° from a lower contact configuration into an upper contact configuration and a movement direction of the arm of the current collector reversed through appropriate conversion or actuation. Accordingly, changing a vehicle between power rail systems is time consuming and involves costs or requires at least a separate actuation of the current collector so that this change can be completed. In the case of the current collectors known from the prior art intervention in the function of the current collector is always required in all cases. This intervention is disadvantageous insofar as it impedes a quick change between power rail systems and thus traffic of rail vehicles across power rail systems.

BRIEF DESCRIPTION OF THE DRAWINGS

In the following the invention is explained in more detail making reference to the enclosed drawings as follows.

DETAILED DESCRIPTION

Figure 1:
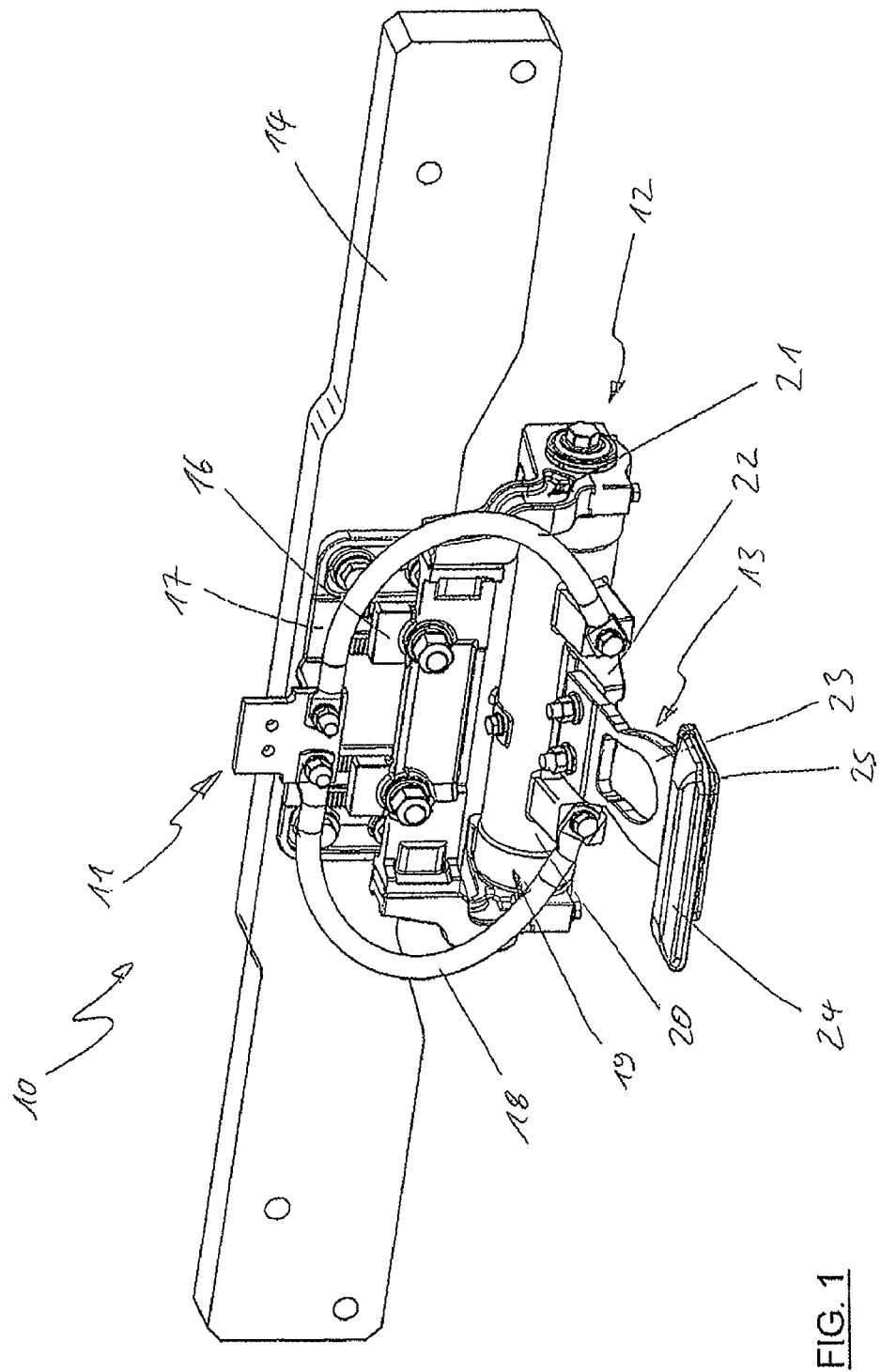
FIG. 1 a perspective view of a current collector with a pressing-on device.

The present invention is based on the object of proposing a pressing-on device for a current collector, a current collector and a method for energy transmission from a power rail to a vehicle which, or with which, a quick change between power rail systems is made possible.

The pressing-on device for a current collector for the energy transmission from a power rail to a vehicle, according to the invention, is designed so that, by means of the pressing-on device, a contact shoe device of the current collector is moveable relative to the power rail and, for forming a sliding contact, can be pressed against the power rail with a pressing-on force in a sliding contact position. According to preferred embodiments, the pressing-on device is designed so that an upper sliding contact surface of the contact shoe device can be pressed against an upper contact surface of a power rail and a lower sliding contact surface of the contact shoe device against a lower contact surface of a power rail, wherein a change between the respective sliding contact positions can be effected with the pressing-on device. Because the change between the upper and lower sliding contact position can be effected by means of the pressing-on device, i.e. the change being performed by the pressing-on device itself, without special intervention required, the change can be performed during a movement of a rail vehicle. Accordingly, the rail vehicle can drive through a boundary between two power rail systems without stopping. Neither a conversion nor actuation of the current collector is required. The pressing-on device rather makes possible the change between the sliding contact positions in that it makes available a pressing-on force against the upper contact surface of the power rail of a power rail system and at the same time a pressing-on force acting in the opposite direction against the lower contact surface of the power rail of a further reciprocal power rail system. The sliding contact surface of the contact shoe device arranged relative to the rail vehicle, depending on the intended position of the respective sliding contact position, is deflected in the opposite direction to that of the sliding contact position so that the required pressing-on force is brought about. The change between the power rails can, for example, be easily carried out on an upper sliding contact surface of a power rail via a trailing ramp to a leading ramp of a lower sliding contact surface of a power rail of another power rail system.

Advantageously the pressing-on device can comprise a rocker unit, wherein the rocker unit is designed rotationally moveable in such a manner that the contact shoe device, starting from an unloaded middle position subject to the formation of a pressing-on force, can be moved into either an upper or lower sliding contact position. The rocker unit can thus make possible a movement of the contact shoe device between the respective sliding contact positions and, thus, the change between the sliding contact positions. Starting from the upper sliding contact position the movement can be effected with a pressing-on force directed upwards via the middle position, in which no pressing-on force is generated, to the lower sliding contact position with a pressing-on force directed downwards, or vice versa. Preferentially the contact shoe device can simultaneously form the upper and the lower sliding contact surface. This can be realized by using an individual contact shoe or alternatively two contact shoes.

In order to make possible fastening of the pressing-on device to a rail vehicle the pressing-on device can comprise a holding device, wherein the holding device serves for the fastening of the rocker unit to a carrier device of the current collector. The rocker unit can be fastened to the holding device so that between the rocker unit and the holding device an axis of rotation of the rocker unit is formed. Preferentially the holding device can be fastened electrically insulated to the carrier device of the current collector.

For generating the necessary pressing-on force the rocker unit can comprise a spring device for generating the pressing-on force. The spring device can comprise a mechanical, pneumatic or hydraulic spring element which is suitable to generate the pressing-on force.

The rocker unit can comprise a sleeve mounted on the holding device in a rotationally fixed manner which surrounds the spring device. Because of this, the spring device can be simply protected from environmental influences and dirt. The sleeve can also be arranged on the holding device so that a longitudinal axis of the sleeve corresponds to an axis of rotation of the rocker unit. In an advantageous embodiment the sleeve can form a fastening device for the contact shoe device. For example an arm or boom of the contact shoe device can simply be mounted to the fastening device, for example by means of screws. Thus the contact shoe device becomes easily exchangeable.

The pressing-on force can be particularly simply generated if the spring device comprises at least one spring, wherein the spring is coupled in such a manner with the sleeve and the holding device that a rotation of the sleeve relative to the holding device brings about the generation of a pressing-on force. Accordingly, the spring can be connected with the sleeve on one end and with the holding device on another end so that a rotation of the sleeve relative to the holding device brings about actuation of the spring and thus the generation of a pressing-on force. For example, the spring device can comprise two coil springs each of which is connected with a spring holder in a rotationally fixed manner. Relative to each other, the coil springs can be arranged coaxially within each other or next to each other. Then, the spring holder can fix the coil springs relative to the holding device or to the sleeve.

In order to bring about a pressing-on force starting from the middle position in both directions of the rotary movement, an upper, or first coil spring can serve for the generation of a pressing-on force against the upper contact surface, and a lower, or second coil spring for generating a pressing-on force against the lower contact surface. Since the contact shoe device has its own specific weight, which influences the respective pressing-on forces, a spring force of the upper coil spring can be greater than a spring force of the lower coil spring. Thus pressing-on forces which are substantially of the same magnitude can be made available for both sliding contact positions.

Furthermore, the spring device can comprise a coupling element in which spring claws that are connected with the coil springs in a rotationally fixed manner each engage, and wherein the coupling element is connected with the sleeve in a fixed manner. Accordingly, the coupling element and the spring claws each form a coupling in the manner of a claw coupling for transmitting a spring force to the coupling element and the sleeve. Coupling element and the spring claws can be designed so that they engage in one another pivot-like, subject to the formation of radial play. The coupling element and the spring claws can each have cams on their contact sides which engage in one another and thus can transmit a rotational moment. Between the cams of the coupling element and the spring claws consequently a play can be formed which allows limited rotation of the coupling element without a spring claw having to be moved. Thus between the coupling element and the spring claws a stop each can be formed, wherein a radial movement of the spring claws relative to the coupling element is limited within an angle of rotation $\alpha$. The respective angles of rotation $\alpha$ can for example be brought about or defined by the prescribed radial play. In this case the radial contact surfaces of the cams can each serve as stops or angle of rotation end positions.

In principle, the spring device, as already described above, can comprise a coupling element and two spring holders. Alternatively it is also possible however that the spring device comprises two coupling elements and one spring holder. The fundamental function of the spring device is not influenced by this.

In order to guarantee secure guidance of the components of the spring device the spring device can comprise an axle, wherein the coupling element and the spring claws are rotatably arranged on the axle, and wherein the axle and the spring claws are so designed that they engage in one another pivot-like, subject to the formation of a radial play. When the axle and spring claws engage in one another pivot-like, a coupling connection in the manner of a slot and key connection can likewise be formed between contact sides or radial circumferential sides of the axle and the spring claws. A slot and key connection is likewise suitable for forming a radial play. Thus, here too, a stop each can be formed between the axle and the spring claws, wherein a radial movement of the spring claws relative to the axle is limited within an angle of rotation $\alpha$. Here, the radial play formed out of the slot and key connection can likewise be so dimensioned that the angle of rotation $\alpha$ is obtained. Advantageously the spring holder and the axle can be fixed on the holding device in a rotationally fixed manner. As a result, setting or tensioning the spring for example by rotating the spring holder is simplified. The stops can be so arranged that, starting from the middle position, the sleeve, in the direction of the sliding contact positions, is rotatable, in each case, in an angle of rotation $\alpha$ relative to the holding device. Consequently the stops can be so arranged that the springs are substantially not clamped against each other and a set spring preload or pressing-on force alone is acting against a stop. Thus it is avoided that the springs influence each other.

The stops can also be arranged so that the sleeve is mounted free of play in the middle position. This means the stops can be so arranged that rotation of the sleeve is not possible without overcoming a spring or pressing-on force. Undesirable movement or vibration of the contact shoe device in the metal or rest position can thus be prevented.

The current collector for the energy transmission from a power rail to a vehicle according to some embodiments of the invention comprises a pressing-on device, according to the invention, and a contact shoe, which forms both a lower sliding contact surface and an upper sliding contact surface. Thus, merely one contact shoe has to be made available for the current collector. It is likewise possible to form a contact shoe device for forming the sliding contact surfaces in one piece.

Figure 2:
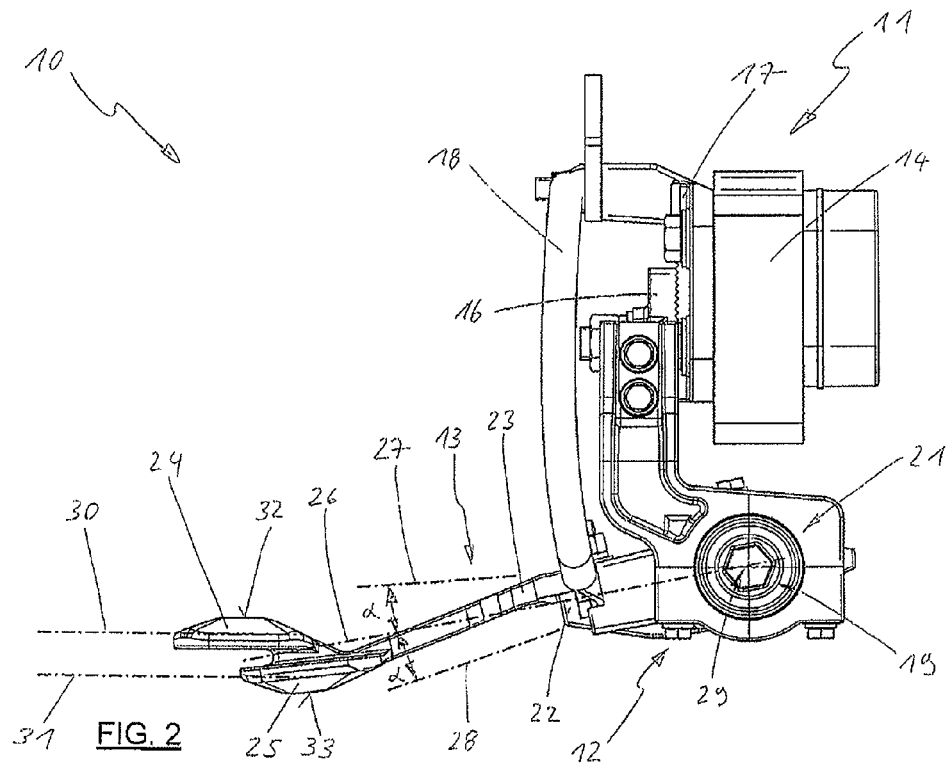
FIG. 2 a lateral view of the current collector.

Viewing FIGS. 1 and 2 together shows a current collector 10 for a rail vehicle which is not shown here. The current collector is formed of a carrier device 11, a pressing-on device 12 and a contact shoe device 13. The carrier device 11 consists of a carrier beam 14, and adjusting plate 16, a connecting plate 17 and connecting cables 18 connected with the pressing-on device 12. The pressing-on device 12 comprises a rocker unit 19 with a sleeve 20 as well as a holding device 21, which holds the rocker unit 19 on the adjusting plate 16. On the sleeve 20 a fastening plate 22 for the contact shoe device 13 is formed which is screwed to an arm 23 of the fastening plate 22. The contact shoe device 13 is formed in one piece so that on the arm 23 two contact shoes 24 and 25 are molded on. The sleeve 20 is mounted rotationally moveable relative to the holding device 21 so that in a middle position 26 marked dash-dotted here it can in each case be swiveled by an angle of rotation α into a maximum upper sliding contact position 27 or optionally into a maximum lower sliding contact position 28. The sliding contact positions 27 and 28 marked here exemplarily show a maximum deflection of the contact shoe device 13 or sleeve 20 by an axis of rotation 29. Here, the contact shoe 24 or 25 can contact a current rail not shown in more detail here with an upper contact surface 30 and a lower contact surface 31 for transmitting electric energy. In the event of a power rail with an upper contact surface 30 the arm 23 is pushed downward against a pressing-on force generated by the rocker unit 19 so that an upper sliding contact surface 32 of the contact shoe 24 comes in contact with the upper contact surface 30 where it forms a sliding contact position which is not shown in more detail here. In the case of a power rail with a lower contact surface 31 the arm 23 is pressed upward against a pressing-on force of the rocker unit 19, so that a lower sliding contact surface 33 of the contact shoe 25 comes in contact with the lower contact surface 31 and thus likewise forms a sliding contact position. The change between the contact surfaces 30 and 31 as well as the sliding contact surfaces 32 and 33 can take place without any manual or mechanical intervention in the pressing-on device 12 whatsoever. In a transition region of power rails merely the formation of leading and trailing ramps which can be present anyhow is necessary. Each of these ramps also form the contact surfaces 30 and 31 so that the contact shoe device 13 via the middle position 26 and from an upper sliding contact position is guided in direction of the maximum upper sliding contact position 27 into a lower sliding contact position in the direction of the maximum lower sliding contact position 28, wherein the change takes place between the power rails and contact surfaces 30 and 31 respectively.

Figure 3:
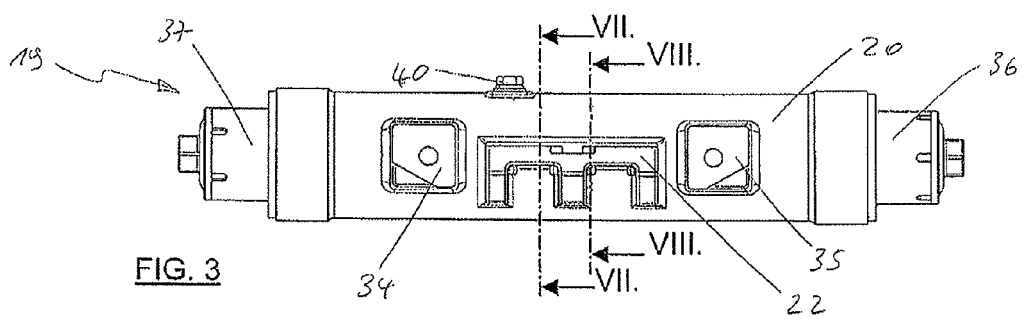
FIG. 3 a front view of a rocker unit of the pressing-on device.
Figure 4:
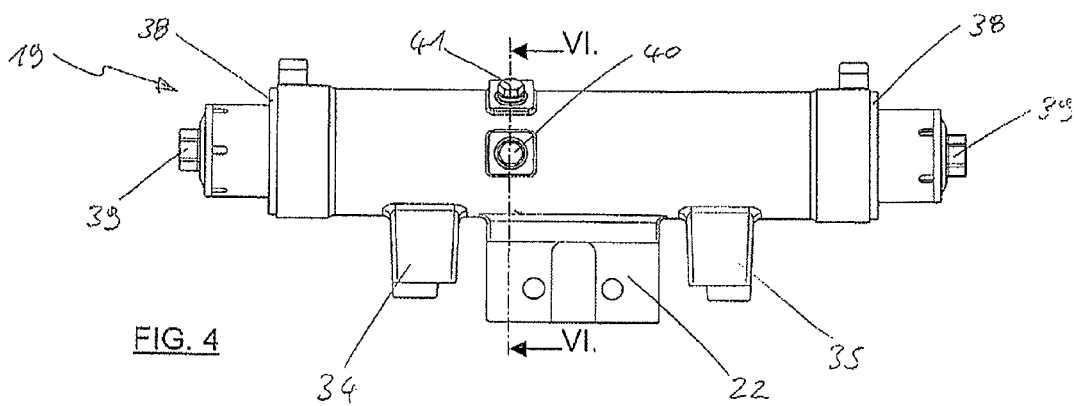
FIG. 4 a top view of the rocker unit.
Figure 5:
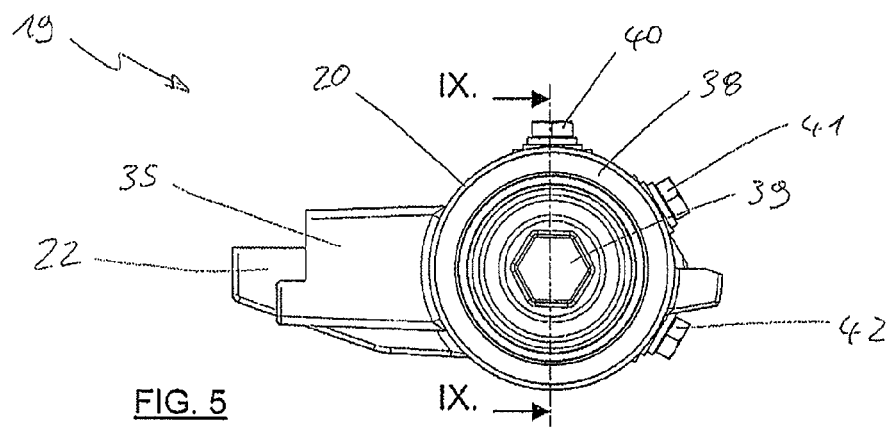
FIG. 5 a lateral view of the rocker unit.
Figure 6:
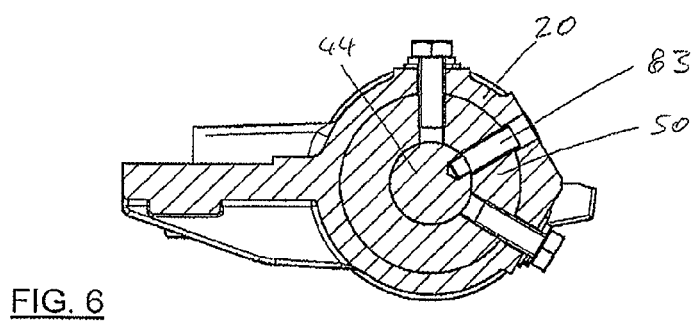
FIG. 6 a lateral view of the rocker unit along a line IV-IV from FIG. 4.
Figure 7:
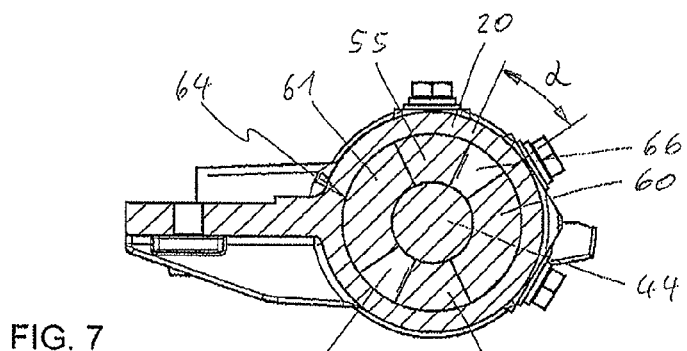
FIG. 7 a sectional view of the rocker unit along a line VII-VII from FIG. 3.
Figure 8:
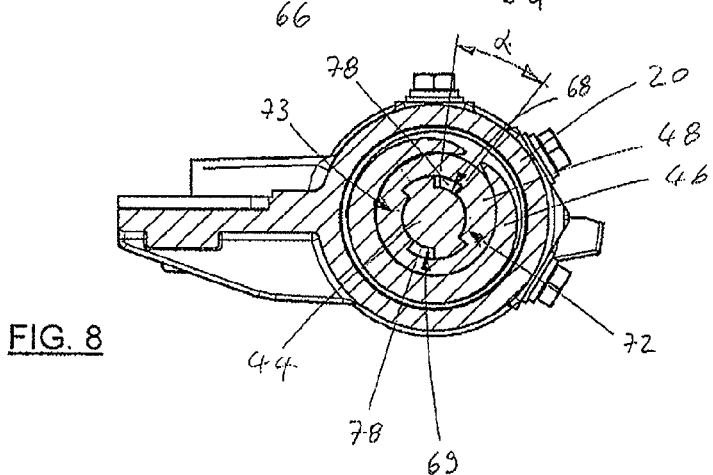
FIG. 8 a sectional view of the rocker unit along a line VIII-VIII from FIG. 3.
Figure 9:
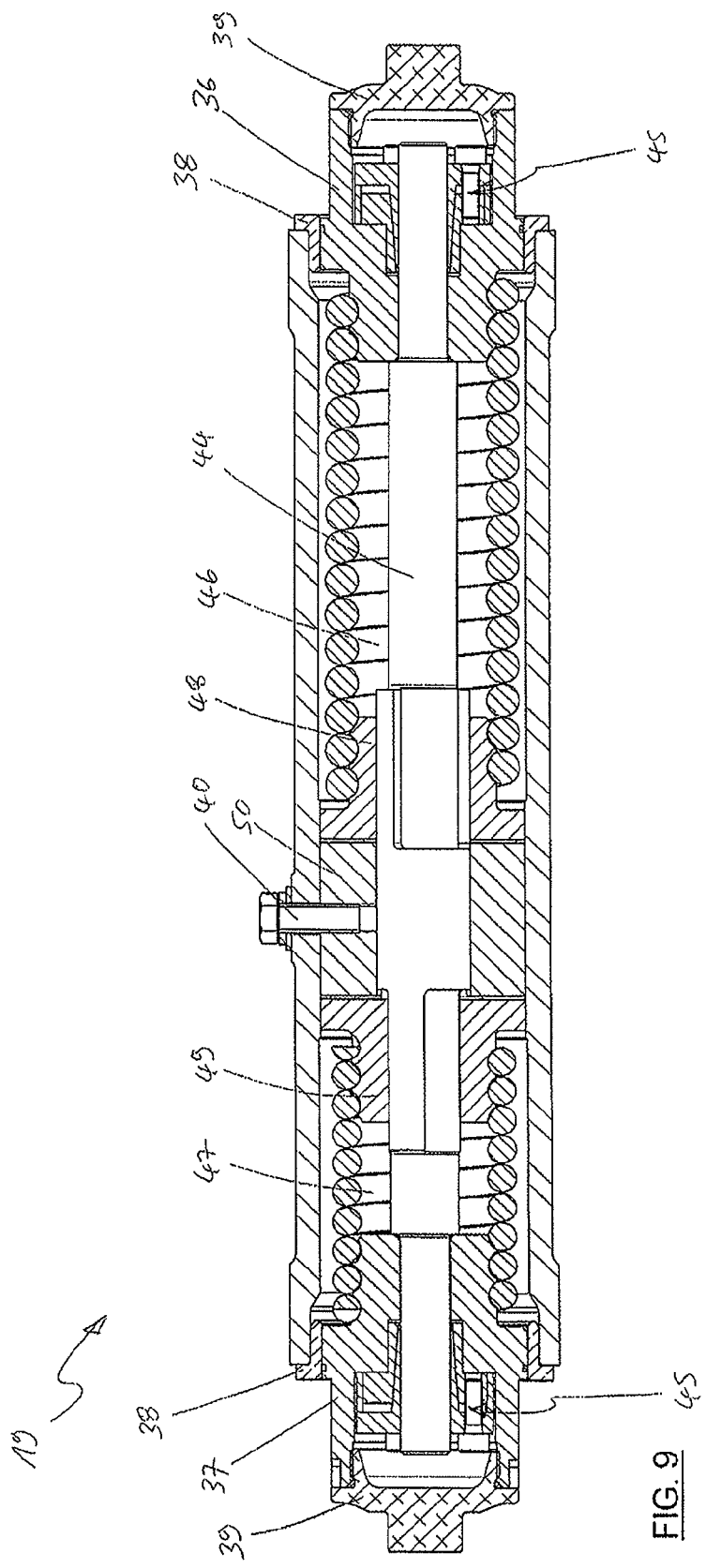
FIG. 9 a sectional view of the rocker unit along a line IX-IX from FIG. 5.

FIG. 3 to 5 each show complete views of the rocker unit 19 with the sleeve 20 and the fastening plate 22 for the contact shoe device 13 molded thereon. Furthermore, fastening humps 34 and 35 are molded onto the sleeve 20 which make possible screwing of the sleeve 20 to the connection cables 18. The sleeve 20 is protruded laterally by an upper spring holder 36 and a lower spring holder 37 each. As is evident when viewing together with FIG. 9, the spring holder 36 and 37 are each mounted in the sleeve 20 via a bearing bush 38 of plastic. Furthermore, the spring holders 36 and 37 are closed with end caps 39. Three fastening screws 40, 41 and 42 are also screwed into the sleeve 20.

A spring device 43 of the rocker unit 19 is shown in more detail in FIG. 6 to 12. The spring device 43 comprises the spring holders 36 and 37 which are connected with an axle 44 in a rotationally fixed manner. The rotationally fixed connection in each case is formed non-positively by means of a clamping device 45. On the upper spring holder 36 an upper coil spring 46 and on the lower spring holder 37 a lower coil spring 47 are fixed. The upper coil spring 46 is comparatively longer with regard to the lower coil spring 47 and formed with a greater spring force since the upper coil spring 46 has to offset a weight of the contact shoe device 13. On the axle 44, an upper spring claw 48, a lower spring claw 49 and a coupling element 50 are additionally mounted in a rotationally moveable manner. The coupling element 50 in turn is screwed to the sleeve 20 by means of the fastening screws 40 to 42 in a fixed manner. The upper spring claw 48 is likewise connected in a fixed manner with the upper coil spring 46 and the lower spring claw 49 with the lower coil spring 47. A rotation of the spring claws 48 and 49 about a longitudinal axis 51 of the rocker unit 19 or the axis of rotation 29 consequently brings about the formation of a spring force in each case, which acts as a pressing-on force.

Figure 10:
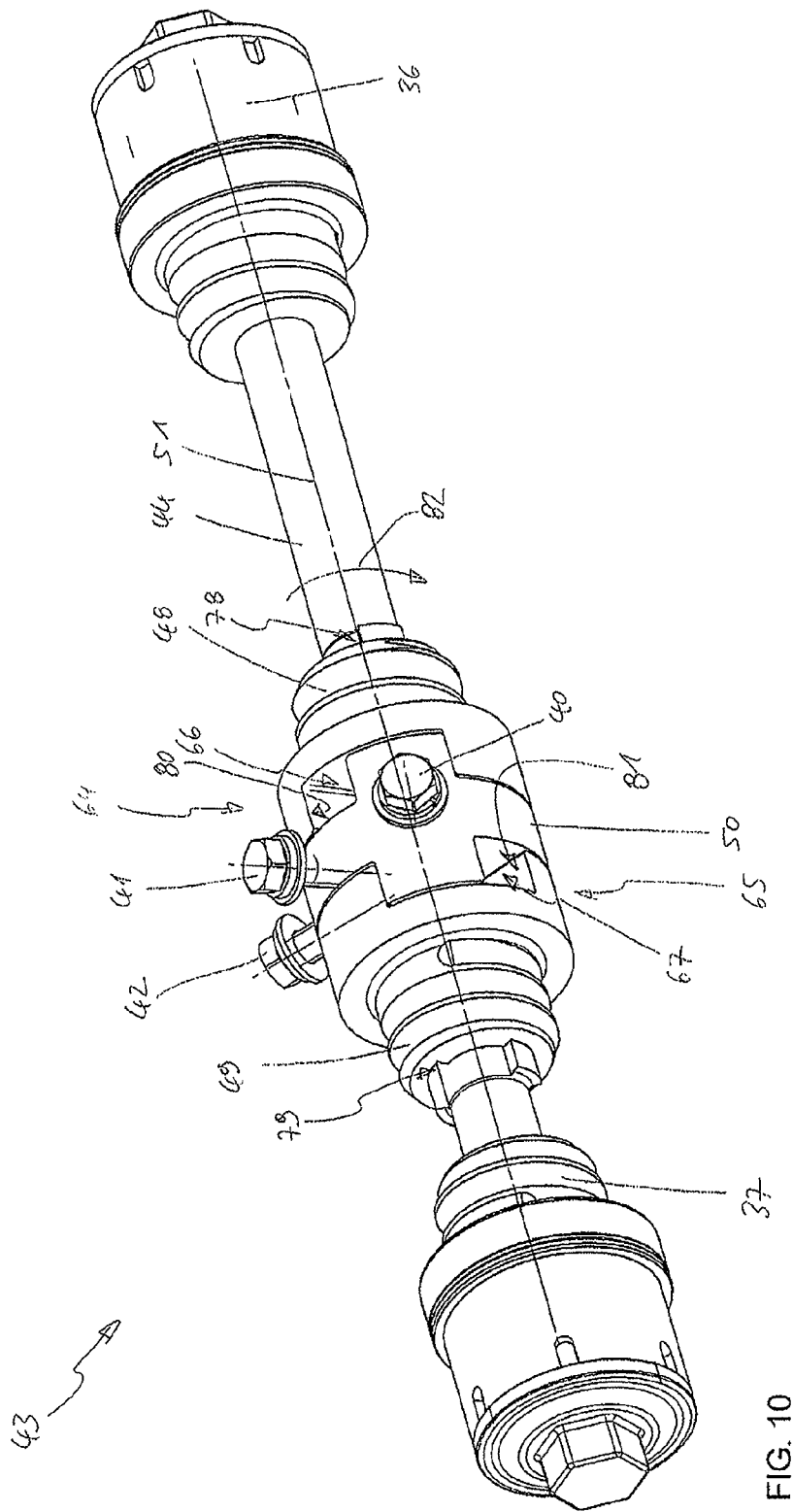
FIG. 10 a part view of a spring device of the rocker unit in a perspective view.
Figures 11, 12:
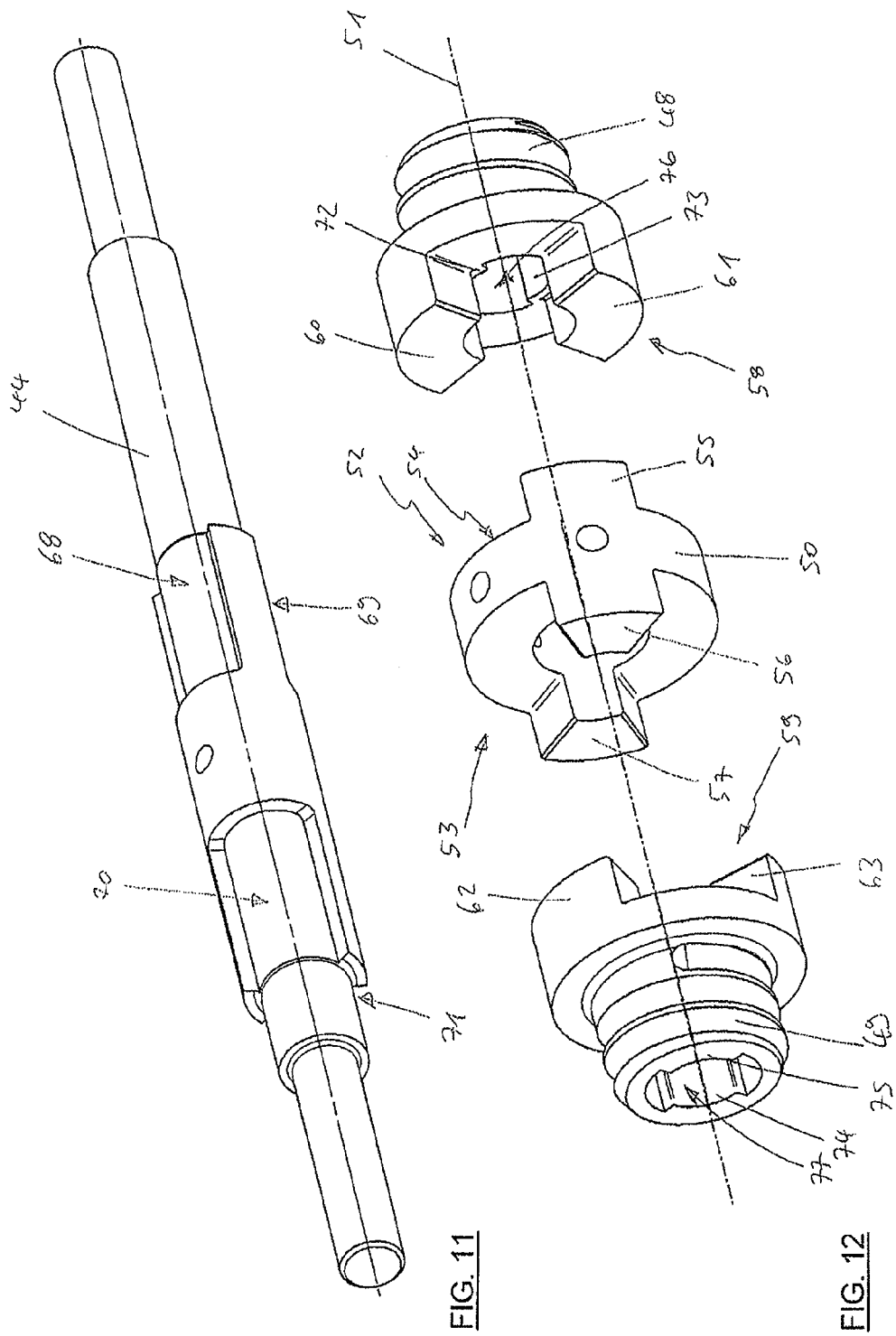
FIG. 11 an axle of the spring device in a perspective view.
FIG. 12 a coupling element and spring claws of the spring device in an exploded view.

As is more preferably evident from FIG. 10 to 12, cams 54 to 57 are each formed on face ends 52 and 53 of the coupling element 50. Face ends 58 and 59 of the upper spring claw 48 and lower spring claw 49 respectively likewise form cams 60 to 63. Thus, a claw coupling 64 and 65 respectively is formed between the coupling element 50 and the upper spring claw 48 and the lower spring claw 49 respectively, each of which make possible a rotation of the spring claws 48 and 49 respectively relative to the coupling element 50 within the scope of play or angle of rotation α. The play is obtained from a movement space 66 and 67 respectively each of which because of the formation of the cams 54 to 67 and 60 to 63 is formed between these respectively.

Furthermore, longitudinal slots 68 to 71 are each formed on the axle 44 in which the webs 72 and 73 of the upper spring claw 48 and webs 74 and 75 of the lower spring claw 49 respectively are inserted. The webs 72 and 73 are formed on an inner side 76 of the lower spring claw 47 and the webs 74 and 75 on an inner side 77 of the upper spring claw 49. The webs 72 to 75 are each dimensioned so that between the webs 72 and 73 and the longitudinal slots 68 and 69 a movement space 78 and between the webs 74 and 75 and the longitudinal slots 70 and 71 a movement space 79 respectively is formed, which makes possible a rotational movement of the upper spring claw 48 and the lower spring claw 49 respectively on the axle 44 within the scope of an angle of rotation α.

The cams 60 to 63 are arranged relative to the webs 72 and 73 and 74 and 75 respectively so that starting from the middle position 26 shown in FIG. 10 a rotation of the coupling element 50 and thus of the sleeve 20 with the contact shoe device 13, each within the scope of the angle of rotation α as far as to a stop 80 and 81 respectively is made possible. As an example, a rotation of the contact shoe device 13 in the direction of the lower sliding contact position 28 is described in the following: the cams 54 and 55 are moved against the cams 60 and 61 in the direction of an arrow 82, so that the upper spring claw 48 is taken along until the stop 81 is reached. The spring force brought about by the upper coil spring 46 then acts as a pressing-on force.

The respective pressing-on force is adjustable by preloading the coil springs 46 and 47. Prior to an installation of the rocker unit 19 or fixing the spring holders 36 and 37 to the holding device 21 by means of clamps the spring holders 36 and 37 can each be rotated relative to the axle 44 if the respective clamping devices 45 are still released. In this case the screw 41 is replaced with a screw 83 shown in FIG. 6 which connects the coupling element 50 with the axle 44 in a fixed manner. A rotation of the spring holder 36 and 37 now causes clamping of the coil springs 46 and 47 respectively and the respective formation of a spring force. Following the clamping of the coil springs 46 and 47 secure fixing of the spring holders 36 and 37 respectively on the axle 44 is effected by means of the clamping devices 45. Following this, the screw 83 is replaced with the screw 41 so that the coupling element 50 is able to rotate relative to the axle 54. Thus it becomes possible for the maximum upper sliding contact position 27 and the maximum lower sliding contact position 28 respectively to each set individual spring forces or pressing-on forces which act within the respective angle of rotation α.

In the foregoing detailed description, the invention has been described with reference to specific embodiments. However, it may be appreciated that various modifications and changes can be made without departing from the scope of the invention as set forth in the appended claims.

The invention claimed is:

1. A current collector for a rail vehicle, the current collector being adapted to travel along a power rail that transmit electric energy to the rail vehicle via the current collector, and the current collector comprising:
a contact shoe device including an upper sliding contact surface and a lower sliding contact surface, the upper sliding contact surface for forming a sliding contact with an upper contact surface of said power rail, and the lower contact surface for forming a sliding contact with a lower contact surface of said power rail; and
a pressing-on device attached to the contact shoe device and allowing the contact shoe device to move between an upper sliding contact position and a lower sliding contact position;
wherein the pressing-on device applies a pressing-on force to the contact shoe device in a first direction, when the contact shoe device is in the upper sliding contact position, and applies a pressing-on force to the contact shoe device in a second direction, when the contact shoe device is in the lower sliding contact position;
the pressing-on force applied in the first direction forms the sliding contact between the upper sliding contact surface of the contact shoe device and the upper contact surface of the power rail; and
the pressing-on force applied in the second direction forms the sliding contact between the lower sliding contact surface of the contact shoe device and the lower contact surface of the power rail.

2. The current collector of claim 1, wherein:
the pressing-on device comprises a rocker unit having an unloaded position, the rocker unit being rotationally moveable from the unloaded position, to allow the contact shoe device to move between the upper sliding contact position and the lower sliding contact position; and
the rotational movement of the rocker unit from the unloaded position brings about formation of the pressing-on forces.

3. The current collector of claim 2, further comprising a carrier device, and wherein the pressing-on device further comprises a holding device that fastens the rocker unit to the carrier device.

4. The current collector of claim 2, wherein the rocker unit comprises a spring device that forms the pressing-on forces.

5. The current collector of claim 4, wherein the spring device comprises a first coil spring and a second coil spring, the first coil spring forming the pressing-on force applied in the first direction, when the contact shoe device is in the upper sliding contact position, and the second coil spring forming the pressing-on force applied in the second direction, when the contact shoe device is in the lower sliding contact position.

6. The current collector of claim 5, wherein a spring force of the first coil spring is greater than that of the second coil spring.

7. The current collector of claim 4, further comprising:
a carrier device; and
wherein the pressing-on device further comprises a holding device that fastens the rocker unit to the carrier device;
the rocker unit further comprises a sleeve that provides the rotational movement of the rocker unit, the sleeve being mounted on the holding device in a rotationally moveable manner, and the sleeve surrounding the spring device; and
the contact shoe device is fastened to the sleeve of the rocker unit.

8. The current collector of claim 7, wherein the spring device comprises a spring being coupled to the sleeve and to the holding device, such that rotation of the sleeve with respect to the holding device causes the spring to form at least one of the pressing-on forces.

9. The current collector of claim 7, wherein:
the spring device comprises a spring holder, a first coil spring and a second coil spring, the first coil spring being coupled to the sleeve and being connected to the spring holder in a rotationally fixed manner, and the second coil spring being coupled to the sleeve and being connected to the spring holder in a rotationally fixed manner;
the first coil spring forms the pressing-on force applied in the first direction, when the contact shoe device is in the upper sliding contact position; and
the second coil spring forms the pressing-on force applied in the second direction, when the contact shoe device is in the lower sliding contact position.

10. The current collector of claim 7, wherein:
the spring device comprises a first spring holder, a second spring holder, a first coil spring and a second coil spring, the first and second spring holders being rotationally fixed with respect to one another and mounted within the sleeve, the first coil spring being coupled to the sleeve and being connected to the first spring holder in a rotationally fixed manner, and the second coil spring being coupled to the sleeve and being connected to the second spring holder in a rotationally fixed manner;
the first coil spring forms the pressing-on force applied in the first direction, when the contact shoe device is in the upper sliding contact position; and
the second coil spring forms the pressing-on force applied in the second direction, when the contact shoe device is in the lower sliding contact position.

11. The current collector of claim 10, wherein a spring force of the first coil spring is greater than that of the second coil spring.

12. The current collector of claim 10, wherein the spring device further comprises a first spring claw, a second spring claw and a coupling element, the first spring claw being connected to the first coil spring in a rotationally fixed manner, the second spring claw being connected to the second coil spring in a rotationally fixed manner, and the coupling element being connected to the sleeve and engaged with each of the first and second spring claws so as to couple the first and second coil springs to the sleeve.

13. The current collector of claim 12, wherein the coupling element engages with the first and second spring claws such that:
  when the coupling element rotates with the sleeve according to the movement of the contact shoe device to the upper sliding contact position, the coupling element rotates relative to the second spring claw and moves the first spring claw against a spring force of the first coil spring; and
  when the coupling element rotates with the sleeve according to the movement of the contact shoe device to the lower sliding contact position, the coupling element rotates relative to the first spring claw and moves the second spring claw against a spring force of the second coil spring.

14. The current collector of claim 13, wherein:
  the rotation of the of coupling element relative to the second spring claw is limited by a stop formed on the second spring claw; and
  the rotation of the coupling element relative to the first spring claw is limited by a stop formed on the first spring claw.

15. The current collector of claim 12, wherein the spring device further comprises an axle, the coupling element and the first and second spring claws are rotatably arranged on the axle.

16. The current collector of claim 15, wherein:
  the axle and the first and second spring holders are fixed in a rotationally fixed manner on the holding device.

\* \* \* \* \*